(12) United States Patent
Nam et al.

(10) Patent No.: US 11,006,313 B2
(45) Date of Patent: May 11, 2021

(54) APPARATUS AND METHOD FOR PROVIDING SERVICE NETWORK IN WIRELESS COMMUNICATION SYSTEM

(71) Applicant: Samsung Electronics Co., Ltd., Suwon-si (KR)

(72) Inventors: Hyeongmin Nam, Suwon-si (KR); Yeonchul Shin, Suwon-si (KR); Inkook Chang, Suwon-si (KR); Joonsung Chun, Suwon-si (KR); Chulhoon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 16/710,614

(22) Filed: Dec. 11, 2019

(65) Prior Publication Data

US 2020/0196182 A1 Jun. 18, 2020

(30) Foreign Application Priority Data

Dec. 12, 2018 (KR) .................. 10-2018-0160133

(51) Int. Cl.
*H04W 28/02* (2009.01)
*H04W 52/02* (2009.01)

(52) U.S. Cl.
CPC ... *H04W 28/0268* (2013.01); *H04W 28/0263* (2013.01); *H04W 52/0229* (2013.01); *H04W 52/0235* (2013.01)

(58) Field of Classification Search
CPC ......... H04W 28/0268; H04W 28/0263; H04W 52/0229; H04W 52/0235; H04W 4/80;
(Continued)

(56) References Cited

U.S. PATENT DOCUMENTS

| 2017/0093727 | A1 | 3/2017 | Chen et al. |
| 2018/0234876 | A1 | 8/2018 | Jheng et al. |
| 2020/0100179 | A1* | 3/2020 | Zhou ............... G06F 1/3209 |

FOREIGN PATENT DOCUMENTS

| JP | 5581655 B2 | 9/2014 |
| KR | 10-1795248 B1 | 11/2017 |
| WO | 2018188481 A1 | 10/2018 |
| WO | 2018202205 A1 | 11/2018 |

OTHER PUBLICATIONS

Garro, E., et al. "5G mixed mode: NR multicast-broadcast services." IEEE Transactions on broadcasting 66.2 (2020): 390-403. (Year: 2020).*

(Continued)

*Primary Examiner* — Sharad Rampuria
(74) *Attorney, Agent, or Firm* — Jefferson IP Law, LLP

(57) ABSTRACT

A pre-5$^{th}$-Generation (5G) or 5G communication system to be provided for supporting higher data rates Beyond 4$^{th}$-Generation (4G) communication system, such as Long-Term Evolution (LTE) is provided. An apparatus for providing a service network in a wireless communication system is provided. The apparatus includes a first transceiver configured to support a first radio access technology (RAT), a second transceiver configured to support a second RAT, and at least one processor configured to access a base station using the first RAT, provide a service network to at least one client device using the second RAT, and transmit at least one signal to restrict the at least one client device from entering a power saving mode, if a traffic of a client device is transferred via a low-latency service provided in the first RAT.

15 Claims, 22 Drawing Sheets

(58) Field of Classification Search
CPC ....... H04W 76/15; H04W 84/12; H04W 4/50;
H04W 28/02; H04W 28/20; H04W 28/24;
Y02D 30/70; H04L 67/12; H04L 69/22;
H04L 47/10; H04L 47/12; H04L 47/20;
H04L 47/24; H04L 47/32; H04L 47/38;
H04L 47/70; H04L 47/72; H04L 47/74;
H04L 47/78; H04L 47/80
See application file for complete search history.

(56) References Cited

OTHER PUBLICATIONS

European Office Action dated Dec. 23, 2020, issued in European Application No. 19215217.1-1215.
Maximizing BLE Throughput on iOS and Android, Punch Through, Apr. 3, 2016, "https://punchthrough.com/blog/posts/maximizing-ble-throughput-on-ios-and-android".
IEEE 802.11ac: Enhancements for Very High Throughput WLANs, Eng Hwee Ong et al., pp. 854-858, 2011.
5G NR User Plane Protocol, What's new Over LTE in 5G NR, Sep. 6, 2017, "http://www.techplayon.com/5g-nr-radio-protocol-user-plane-whats-new-lte-5g-nr/".
3rd Generation Partnership Project; Technical Specification Group Services and System Aspects; System Architecture for the 5G System (5GS); Stage 2 (Release 16), 3GPP TS 23.501 V16.2.0, Sep. 2019.
Extended European Search Report dated Mar. 30, 2020, issued in European Application No. 19215217.1-1215.

\* cited by examiner

APPARATUS AND METHOD FOR PROVIDING SERVICE NETWORK IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0160133, filed on Dec. 12, 2018, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for providing a service network in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Various services using a 5G system are being considered. For example, a method of using a 5G system in order to provide a communication service in a predetermined space, such as a home, an office, or the like, is being considered. For example, generally, it is considered to replace a communication line, provided in a wired form, such as an optical cable or the like, with a wireless channel using the 5G system. In this instance, research on effective interworking between the 5G system and a service network provided in a predetermined space is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for effectively providing a service network in a wireless communication system.

Another aspect of the disclosure is to provide a method and an apparatus for reducing latency in a service network in a wireless communication system.

Another aspect of the disclosure is to provide a method and an apparatus for providing a broadband service in a service network in a wireless communication system.

Another aspect of the disclosure is to provide a method and an apparatus for restricting an operation mode of a device that accesses a service network in a wireless communication system.

Another aspect of the disclosure is to provide a method and an apparatus for restricting a packet size of a device that accesses a service network in a wireless communication system.

Another aspect of the disclosure is to provide a method and an apparatus for controlling a connection interval of a device that accesses a service network in a wireless communication system.

Another aspect of the disclosure is to provide a method and an apparatus for controlling the priority of traffic of a device that accesses a service network in a wireless communication system.

Additional aspects will be set forth in part in the description which follows and, in part, will be apparent from the description, or may be learned by practice of the presented embodiments.

In accordance with an aspect of the disclosure, an apparatus for providing a service network in a wireless communication system is provided. The apparatus includes a first transceiver configured to support a first radio access technology (RAT), a second transceiver configured to support a second RAT, and at least one processor configured to access a base station using the first RAT, provide a service network to at least one client device using the second RAT, and transmit at least one signal to restrict the at least one client device from entering a power saving mode, if a traffic of a client device is transferred via a low-latency service provided in the first RAT.

In accordance with another aspect of the disclosure, an operation method of an apparatus that provides a service network in a wireless communication system is provided. The method includes while performing control so as to access a base station using a first radio access technology (RAT), and to provide a service network to at least one client device using a second RAT, determining that a traffic of the client device is transferred via a low-latency service provided in the first RAT, and transmitting at least one signal in order to restrict the client device from entering a power saving mode.

A method and an apparatus according to various embodiments may control the state, configuration, and scheduling associated with a second network based on the quality of service (QoS) of a first network in the state in which the second network is provided by using the first network as a backhaul network, and may provide the QoS provided in the first network to a device that accesses the second network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
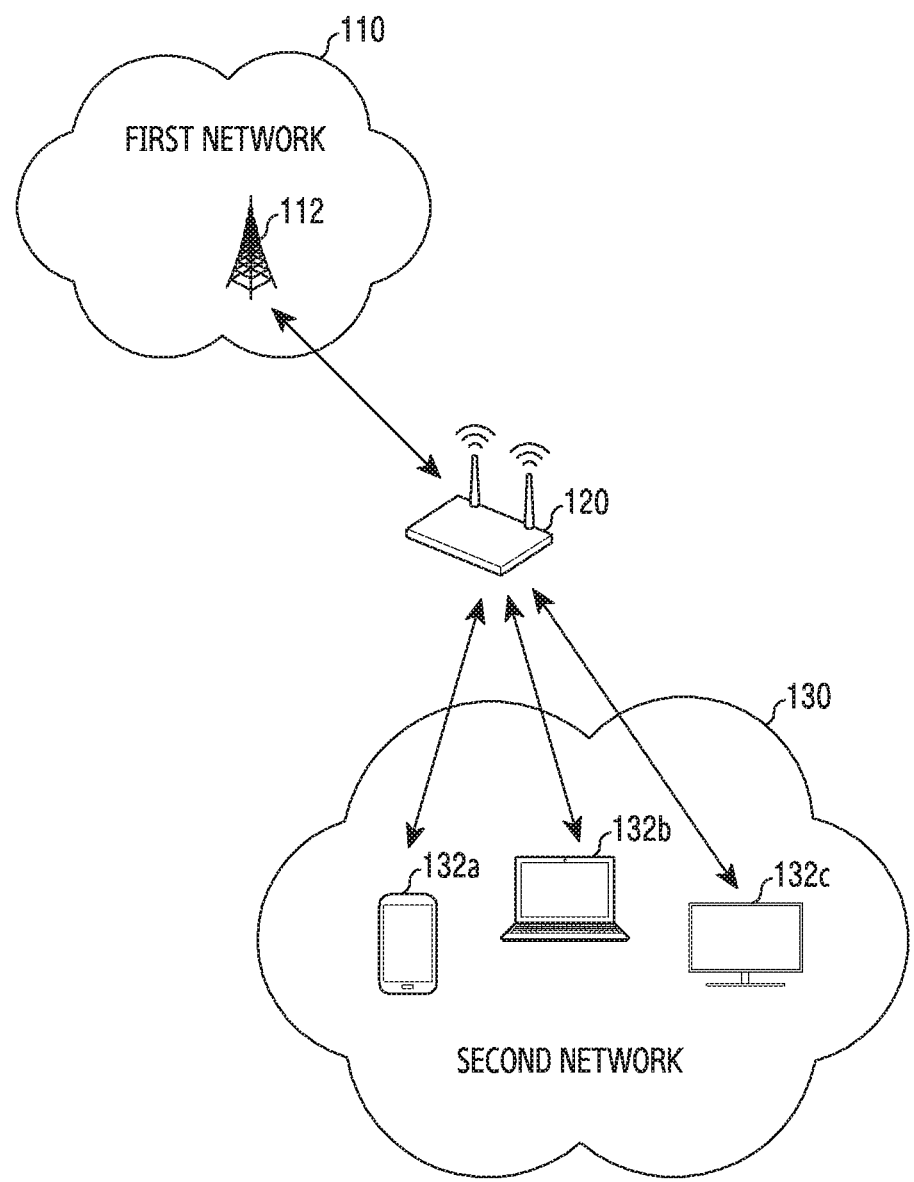
FIG. 1 is a diagram illustrating a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to a method and an apparatus for providing a service network in a wireless communication system. More particularly, the disclosure provides a description of a technology for satisfying service requirements in a wireless communication system.

Hereinafter, terms used in the description, such as, a term indicating a signal, a term indicating a channel, a term indicating control information, a term indicating an operation state (e.g., a mode), a term indicating a data processing scheme, a term indicating a network entity, a term indicating an element of a device, and the like are merely used for ease of description. Accordingly, the disclosure is not limited to the terms used in the description, and other terms having the same technical meaning may be used.

Although the disclosure describes various embodiments using the terms used in some communication standards (e.g., 3rd generation partnership project (3GPP)), the embodiments are merely examples. Various embodiments may be easily modified and applied to other communication systems.

FIG. 1 is a diagram illustrating a wireless communication system according to an embodiment of the disclosure.

Referring to FIG. 1, a wireless communication system may include a first network 110, a service network provision device 120, and a second network 130. FIG. 1 illustrates a base station 112 included in the first network 110, a service network provision device 120, and client devices 132a, 132b, and 132c included in the second network 130, as some of the nodes that use a wireless channel.

The first network 110 is an infrastructure including the base station 112, and may further include various core network equipments in addition to the base station 112. For example, the first network 110 may further include various function entities, such as an access and mobility management function (AMF), a session management function (SMF), a user plane function (UPF), and the like.

The base station 112 may provide radio access to the service network provision device 120 using a first radio access technology (RAT) corresponding to the first network 110. The base station 112 may have coverage defined by a predetermined geographical area based on a distance to which the base station 112 is capable of transmitting a signal. The base station 112 may be referred to as an access point (AP), an eNodeB (eNB), a 5th generation node (5G node), a next generation nodeB (gNB), a wireless point, a transmission/reception point (TRP), or other terms having the technical meaning equivalent thereto, in addition to a base station.

The service network provision device 120 may function as a terminal for the first network 110, and may function as an external network access device for the second network 130. For example, the service network provision device 120 may operate as a terminal that accesses the first network 110 using the first RAT, and in parallel, may provide the second network 130 to the client devices 132a, 132b, and 132c. In other words, the service network provision device 120 may receive traffic from the client devices 132a, 132b, and 132c using the second RAT, and may transmit the traffic of the client devices 132a, 132b, and 132c to an external network (e.g., Internet network) via the base station 112 using the first RAT. In addition, the service network provision device 120 may receive traffic from the client devices 132a, 132b, and 132c from an external network (e.g., Internet network) via the base station 112 using the first RAT, and may transmit the traffic to the client devices 132a, 132b, and 132c using the second RAT. From the perspective of the first network 110, the service network provision device 120 may be referred to as a terminal, a user equipment (UE), a mobile station, a subscriber station, a remote terminal, a wireless terminal, a customer premise equipment (CPE), a user device, or other terms having the technical meaning equivalent thereto. From the perspective of the second network 130, the service network provision device 120 may be referred to as an access point (AP), a service network provision device, a service relay device, a heterogeneous network relay device, a heterogeneous RAT relay device, or other terms having the technical meaning equivalent thereto.

The first network 110 and the second network 130 may have a difference in at least one of the size of coverage, the type of network, a RAT, a communication band, a scheduling scheme, or QoS requirements. For example, the first network 110 may be a cellular network, and particularly, may comply with one of long term evolution (LTE), LTE-advanced (LTE-A), and new radio (NR). For example, the second network 130 may be a short-range network, and particularly, may comply with one of a wireless local area network, Bluetooth, Bluetooth low energy (BLE), or Zigbee.

Figure 2:
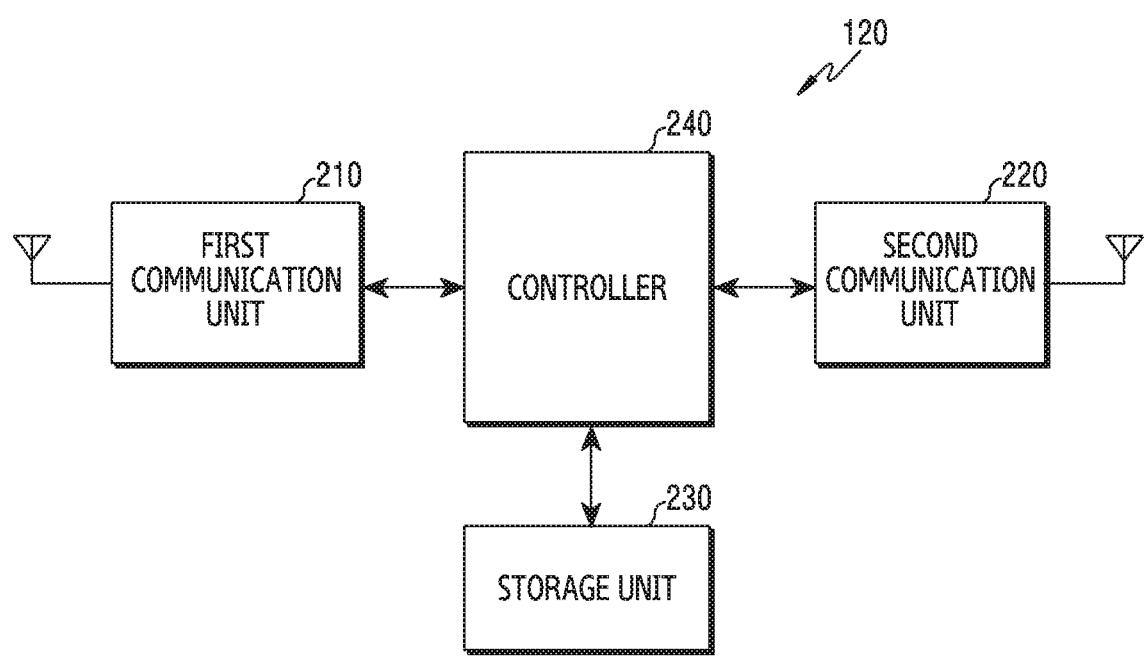
FIG. 2 is a block diagram of a service network provision device in a wireless communication system according to an embodiment of the disclosure.

FIG. 2 is a block diagram of a service network provision device in a wireless communication system according to an embodiment of the disclosure. The configuration of FIG. 2 may be understood as the configuration of the service network provision device 120. The term "unit" or "~er" used hereinafter may refer to a unit for processing at least one function or operation and may be implemented in hardware, software, or a combination of hardware and software.

Referring to FIG. 2, the service network provision device may include a first communication unit 210, a second communication unit 220, a storage unit 230, and a controller 240.

The first communication unit 210 and the second communication 220 may perform functions for transmitting or receiving a signal via a wireless channel. For example, each of the first communication unit 210 and the second communication unit 220 may perform conversion between a baseband signal and a bitstream according to the physical layer standard of the system. For example, in the case of data transmission, the first communication unit 210 and the second communication unit 220 encode and modulate a transmission bitstream, so as to generate complex symbols. In addition, in the case of data reception, the first communication unit 210 and the second communication unit 220 decode and demodulate a baseband signal, so as to restore a reception bitstream. In addition, the first communication unit 210 and the second communication unit 220 up-convert a baseband signal into an RF band signal and transmit the same via an antenna, and down-convert an RF band signal received via an antenna into a baseband signal. For example, each of the first communication unit 210 and the second communication unit 220 may include a transmission filter, a reception filter, an amplifier, a mixer, an oscillator, a digital-to-analog convertor (DAC), an analog-to-digital convertor (ADC), and the like. In terms of hardware, each of the first communication unit 210 and the second communication unit 220 may be configured with a digital circuit and an analog circuit (e.g., a radio frequency integrated circuit (RFIC)). Here, the digital circuit and the analog circuit may be implemented as a single package.

The first communication unit 210 and the second communication unit 220 may support different RATs. For example, the different RATs may include BLE, wireless LAN, Bluetooth, Zigbee, a cellular network (e.g., LTE or the like). For example, the first communication unit 210 may provide an interface for accessing a first network (e.g., the first network 110), and the second communication unit 220 may provide an interface for accessing a second network (e.g., the second network 130).

The first communication unit 210 or the second communication unit 220 may transmit and receive signals as described above. Accordingly, the entirety or a part of the first communication unit 210 or the second communication unit 220 may be referred to as a transmitting unit, a receiving unit, or a transceiving unit. In addition, the transmission and reception performed via a wireless channel, which is described in the following description, may be understood as a meaning including the case in which the above-described processing is performed by the first communication unit 210 or the second communication unit 220.

The storage unit 230 may store data, such as a basic program for operations of a terminal, an application program, configuration information, and the like. The storage unit 230 may be implemented as a volatile memory, a non-volatile memory, or a combination of a volatile memory and a non-volatile memory. In addition, the storage unit 230 may provide data stored therein in response to a request from the controller 240.

The controller 240 may control overall operation of the service network provision device. For example, the controller 240 may transmit and receive signals via the first communication unit 210 or the second communication unit 220. In addition, the controller 240 may perform data mapping, transferring, or distribution between the first communication unit 210 and the second communication unit 220. Further, the controller 240 records data in the storage unit 230 and reads the recorded data. The controller 240 may perform functions of a protocol stack that the communication standard requires. To this end, the controller 240 may include at least one processor or micro-processor, or may be a part of the processor. According to various embodiments of the disclosure, the controller 240 may perform control, so as to access a base station (e.g., the base station 112) using a first RAT, and to provide a service network to at least one client device using a second RAT. For example, the controller 240 may use a first network based on the first RAT as a backhaul network. According to various embodiments of the disclosure, the controller 240 may perform control so that the service network provision device performs operations according to various embodiments described below.

Figure 3:
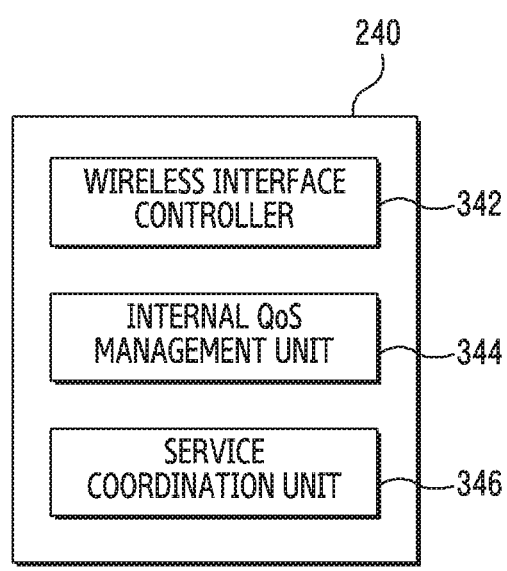
FIG. 3 is a functional block diagram of a controller of a service network provision device in a wireless communication system according to an embodiment of the disclosure.

FIG. 3 is a functional diagram of a controller of a service network provision device in a wireless communication system according to an embodiment of the disclosure. The configuration of FIG. 3 may be understood as the configuration of controller 240 of the service network provision device 120. The term "unit" or "~er" used hereinafter may refer to a unit for processing at least one function or operation and may be implemented in hardware, software, or a combination of hardware and software.

Referring to FIG. 3, the controller 240 may include a wireless interface controller 342, an internal quality of service (QoS) management unit 344, and a service coordination unit 346.

The wireless interface controller 342 may control a communication-related setting in a second network (e.g., the second network 130) based on information associated with a service or flow in a first network (e.g., the first network 110). The wireless interface controller 342 may control a service network provision device-specific setting (e.g., related to a broadcasting message), a client device-specific setting (e.g., periodic packet transmission or the like), an application-specific setting (e.g., related to channel contention), and the like. The wireless interface controller 342 may perform service type-based control, based on information associated with the type of service of a first RAT, such as a low-latency service, a broadband service, or the like, information associated with the type of a wireless interface of a second RAT (e.g., wireless LAN, Bluetooth, BLE, Zigbee, or the like), information associated with a client device (e.g., a media access control (MAC) address, the type of operating system (OS), and the like). For example, the wireless interface controller 342 may control settings associated with the second RAT in order to decrease latency or increase a bandwidth. More particularly, the wireless interface controller 342 may control the transmission period of a predetermined message (e.g., a beacon) according to the average amount of a low-latency service used, and may prevent a client device that currently uses the low-latency service from entering a power saving mode (PSM).

The internal QoS management unit 344 may manage a QoS-related setting for communication in the second network. The QoS-related setting may be managed by queue management. For example, the internal QoS management unit 344 may designate a buffer with a priority, in order to perform internal scheduling. Through the above, the internal QoS management unit 344 may set a priority for a transmission control protocol (TCP) acknowledge (ACK) and the like used for the low-latency service. In addition, the internal QoS management unit 344 may provide QoS flow identity (QFI) tagging, which corresponds to the QoS of the first network.

In addition, the internal QoS management unit 344 may determine a total delay limitation by taking into consideration the state of a modem (e.g., the first communication unit 210) for the first network and the state of a service network (e.g., the second network), and may monitor and optimize a delay in each section (e.g., a delay in the first network, a delay in the second network, and an internal delay (e.g., queuing and processing)). For example, if the internal delay is considered as a fixed value, the internal QoS management unit 344 may determine the delay margin of the second network according to the delay of the first network, or may determine the delay margin of the first network according to the delay of the second network, and may control the entire delay.

The service coordination unit 346 may perform QoS mapping between the first network and the second network by taking into consideration the type of service. In addition, the service coordination unit 346 may configure a bearer that is capable of securing QoS using a protocol (e.g., service data adaptation protocol (SDAP)) of the first network. In addition, the service coordination unit 346 may generate a new bearer for the first network, as needed.

The wireless interface controller 342, the internal QoS management unit 344, and the service coordination unit 346 may be a set of instructions or codes stored in the storage unit 230, may be instructions/codes at least temporarily residing in the controller 240 or a storage space that stores instructions/codes, or may be a part of a circuit (circuitry) included in the controller 240. In addition, according to various embodiments of the disclosure, at least one of the wireless interface controller 342, the internal QoS management unit 344, or the service coordination unit 346 may be omitted.

As described above, the service network provision device may support radio access of client devices between the first network and the second network. A client device that accesses a service network, that is, the second network, is not directly under the control of the first network. Accordingly, a service supported in the first network may be difficult to provide to the client device, depending on the protocol of the RAT of the service network. For example, the QoS performance provided in the network to which the service network provision device accesses may not be secured for a client, which is an end user, due to restrictions related to a service network. Therefore, the disclosure provides examples in which service requirements in the first network are not satisfied due to the situation in the second network, and various operations that a service network provision device performs in order to overcome the examples.

The first network may provide a low-latency service that does not allow a transmission delay which is greater than or equal to a predetermined level. Here, the low-latency communication service may be referred to as an ultra reliable low latency communications (URLLC) service. The low-latency communication service is a service that secures a low transmission delay so that a transmission delay is less than a predetermined threshold value, and may have a priority higher than those of other services in the first network. For example, in order to secure a low transmission delay, resources for the low-latency communication service may be allocated by punctuating resources that are already allocated for other services, or may be allocated to superpose the resources that are already allocated for other services. For example, applications, such as financial transaction, remote controlling, virtual reality (VR)/augmented reality (AR), telemedicine, game, smart grid, and the like may be implemented based on the low-latency service, and a required end-to-end (E2E) latency may be less than or equal to 10 ms. However, if a client device that uses a wireless LAN operates in a power saving mode, the client device performs wake-up for each beacon period and checks a state, and thus, a reception delay may occur. In addition, a transmission/reception delay may occur due to packet aggregation supported in a wireless LAN, channel contention, and the like.

First, a power saving mode supported in the wireless LAN technology will be described as follows. The mechanism of a generally used power saving mode is an adaptive PSM (A-PSM). A-PSM is operated as a combination of an active mode that always enables communication and a power saving mode that is capable of transmitting a packet only after transmitting a predetermined packet. An example of downlink communication according to A-PSM is illustrated in FIG. 4.

Figure 4:
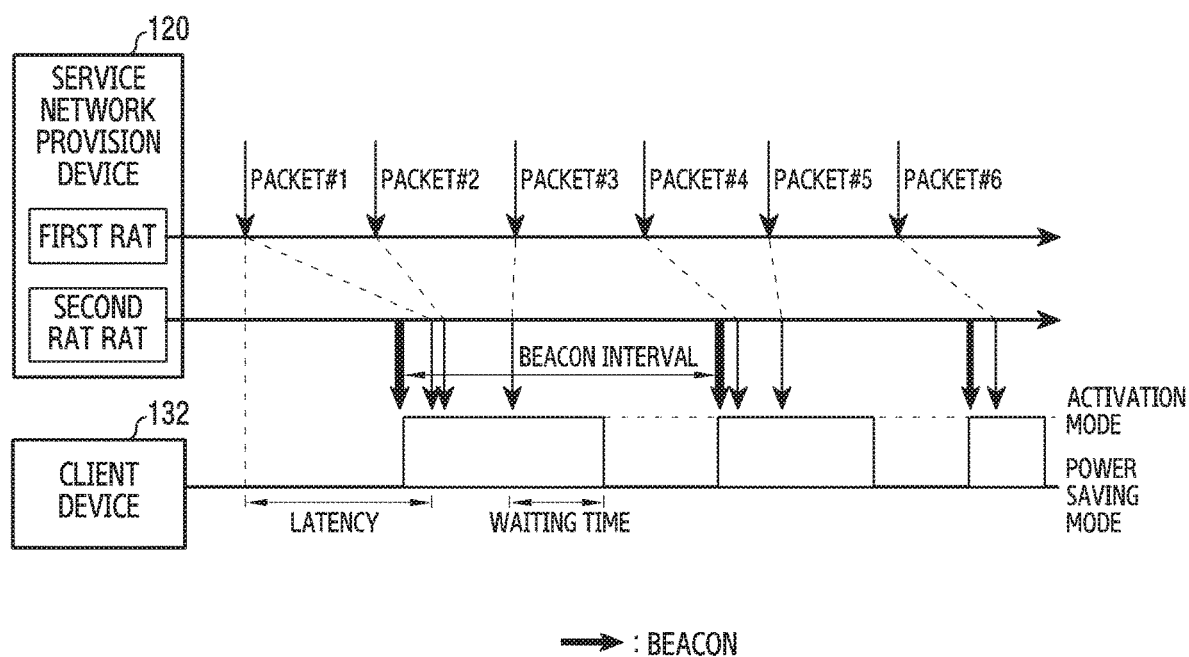
FIG. 4 is a diagram illustrating a packet delay caused by an operation mode of a client device in a wireless communication system according to an embodiment of the disclosure.

FIG. 4 is a diagram illustrating a packet delay caused by an operation mode of a client device in a wireless communication system according to an embodiment of the disclosure.

Referring to FIG. 4, the service network provision device 120 transmits a beacon signal periodically (e.g., a period of 102.4 ms). In this instance, the service network provision device may display whether a packet to be transmitted exists for each terminal, using a traffic indication map (TIM) field. The client device 132 may change a sleep state into an awake state immediately before a point in time at which a beacon is transmitted, and may receive the beacon. If a downlink packet to be transmitted to the client device 132 exists, the client device 132 may transmit a packet (e.g., a null data packet) to the service network provision device 120 so as to report changing to an active mode. Subsequently, the service network provision device 120 transmits a downlink packet to the client device 132 which is in the active mode. Subsequently, if a packet is not received during a waiting time, the client device 132 changes from the active mode to the power saving mode again. The waiting time may be referred to as a tail time. The length of the waiting time may be different for each device and setting (e.g., several tens of ms to hundreds of ms), and whether the remaining waiting time is reset when a beacon is received may be different for each device.

In the above-described situation, packet #1 and packet #2 received by the service network provision device 120 while the client device 132 is in the power saving mode may not be transmitted until the client device 132 is changed to the active mode. Accordingly, a transmission delay may occur. In addition, if an initial packet or the transmission interval of a packet is longer than the waiting time, a transmission delay caused by waiting for a subsequent beacon transmission may continuously occur. For example, if a packet is not received during the waiting time, the client device 132 is changed to the power saving mode again, a transmission delay caused by mode change may repeatedly occur. In the case of FIG. 4, transmission delays associated with packet #4 and packet #6 may occur, as well as transmission delays associated with packet #1 and packet #2.

Figure 5:
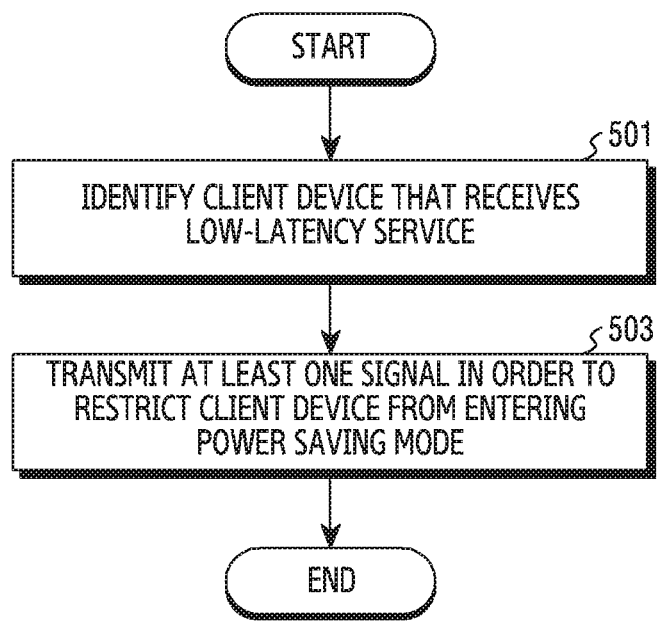
FIG. 5 is a flowchart illustrating an operation procedure of restricting an operation mode of a client device in a wireless communication system according to an embodiment of the disclosure.

FIG. 5 is a flowchart illustrating an operation procedure of restricting an operation mode of a client device in a wireless communication system according to an embodiment of the disclosure. FIG. 5 illustrates the operation method of the service network provision device 120.

Referring to FIG. 5, in operation 501, the service network provision device identifies a client device that receives a low-latency service. Herein, the client device that receives the low-latency service includes a client device that requires the low-latency service. The client device that receives the low-latency service may be identified based on at least one of information (QoS) associated with a bearer of a first RAT which is mapped to a connection of a second RAT with the client device, a message received from the client device, or an analysis of traffic of the client device. Here, the traffic of the client device includes at least one of traffic transmitted to the client device and traffic received from the client device. The client device that receives the low-latency service may be specified using identification information (e.g., a MAC address) of a predetermined layer.

In operation 503, the service network provision device transmits at least one signal in order to restrict the client device from entering a power saving mode. The signal may be a control message, or may include data traffic. Here, the control message may include a control packet defined in the standard of the second RAT, or may include a data packet that expresses a predetermined indication using the value of a predetermined location of data. For example, the control message may be a control message that indicates a predetermined operation to a predetermined client device, or may be a control message broadcasted to a plurality of client devices.

According to an embodiment described with reference to FIG. 5, the service network provision device may transmit at least one signal in order to restrict a client device from entering the power saving mode. Detailed embodiments associated with restriction of entering the power saving mode will be described. Among the embodiments provided below, two or more embodiments may be selectively implemented together.

According to an embodiment of the disclosure, the service network provision device transmits a data packet periodically to a client device that is in a sleep state, so as to control the client device to maintain an active mode. Here, the data packet may include null data or dummy data, may be a small size packet having a predetermined value, or may include data which waits in a queue so as to be transmitted to a corresponding client device. The transmission period of the data packet may be set to be less than or equal to a waiting time (e.g., a tail time) which is for mode changing of the client device, may be set to a predetermined small value, or may be set by a predetermined algorithm. For example, if the transmission period is set based on a predetermined algorithm, the service network provision device sequentially increases the transmission interval of the data packet from the minimum value. If it is identified that the client device enters the sleep state, the service network provision device may decrease the transmission interval by a predetermined value. The method based on a predetermined small value or a predetermined algorithm may be utilized even though the waiting time of the client device cannot be identified.

According to an embodiment of the disclosure, the service network provision device decreases the transmission period of a beacon signal, so as to restrict the client device from entering the sleep state. By indicating that a packet to be transmitted to the corresponding client device exists via a predetermined field (e.g., a TIM field) included in the beacon signal, the service network provision device may restrict mode changing of the corresponding client device to the power saving mode, or may control the corresponding client device to change a mode from the power saving mode to the active mode. For example, although the client device enters the sleep state, the client device changes the state into a wake-up state again within a relatively short time. The transmission period of the beacon signal may be set to a short length, or may be controlled according to delay requirements. Alternatively, the period of the beacon signal may be decreased based on a history associated with decreasing the period of the beacon signal, or a history associated with provision of the low-latency service.

According to an embodiment of the disclosure, a predetermined packet that indicates maintaining of an active mode may be defined. The service network provision device transmits a packet that indicates maintaining of an active mode to a corresponding client device. Accordingly, the client device that receives the packet may not enter the power saving mode even though packet transmission or reception does not occur during a waiting time. Additionally, if the low-latency service is terminated, the service network provision device may transmit another packet indicating that the power saving mode is allowed. Each of the packet that indicates maintaining of the active mode and the packet indicating that the power saving mode is allowed is a control packet defined for the corresponding purpose, or may be implemented as a data packet including a predetermined value in a predetermined location.

In the embodiments described with reference to FIG. 5, the service network provision device may identify a client device that receives a low-latency service. Detailed embodiments associated with identification of a client device that receives a low-latency service are as follows.

Figure 6A:
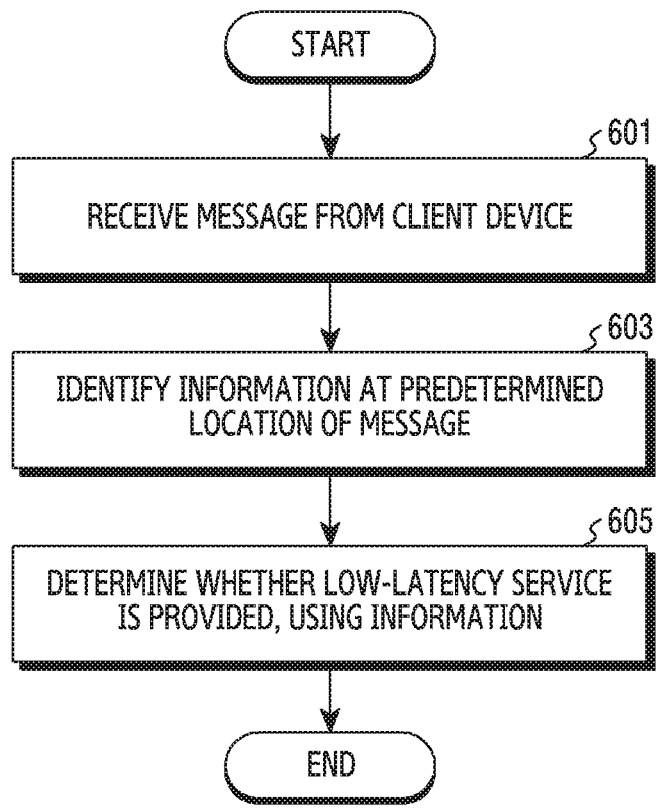
FIG. 6A is a flowchart illustrating an operation procedure of identifying a type of service provided to a client device via signaling in a wireless communication system according to an embodiment of the disclosure.

FIG. 6A is a flowchart illustrating an operation procedure of identifying a type of service provided to a client device via signaling in a wireless communication system according to an embodiment of the disclosure. FIG. 6A is a procedure in which a client device informs a service network provision device of the type of service that the client device is to currently use, such as a low-latency service or the like, and illustrates the operation method of the service network provision device 120.

Referring to FIG. 6A, in operation 601, the service network provision device receives a message from a client device. The message may be a frame for transferring a predetermined type of data which is defined in a first RAT, or may be a control frame. For example, the frame may include a vendor-specific action frame, or a probe request frame.

In operation 603, the service network provision device identifies information at a predetermined location of the message. The information indicates whether the low-latency service is provided or required, and the predetermined location may be defined by various schemes, such as the name of a field, the location of a bit, and the like. For example, if the predetermined location is defined by the name of a field, the service network provision device may analyze the message and may identify the location of the field defined. As another example, if the predetermined location is defined by the location of a bit, the service network provision device may identify the value of a defined nth bit. In addition, the information may further include an indicator indicating whether the purpose of the corresponding message is to indicate whether the low-latency service is provided.

In operation 605, the service network provision device determines whether the low-latency service is provided, using the information. The service network provision device may identify whether the low-latency service is provided, using information extracted from the predetermined location. Additionally, the service network provision device may identify whether the received message is a message for indicating whether the low-latency service is provided, and may identify whether the low-latency service is provided.

According to the embodiment which has been described with reference to FIG. 6A, whether the low-latency service is provided is determined by the client device and is reported to the service network provision device. This embodiment may be implemented when a service application (e.g., a built-in app or a 3rd party app) of the client device includes a function (e.g., an agent or a software development kit (SDK)) of reporting whether the low-latency service is provided to the service network provision device. Embodiments of a message for transferring information reported from a client device are as follows.

Figure 6B:
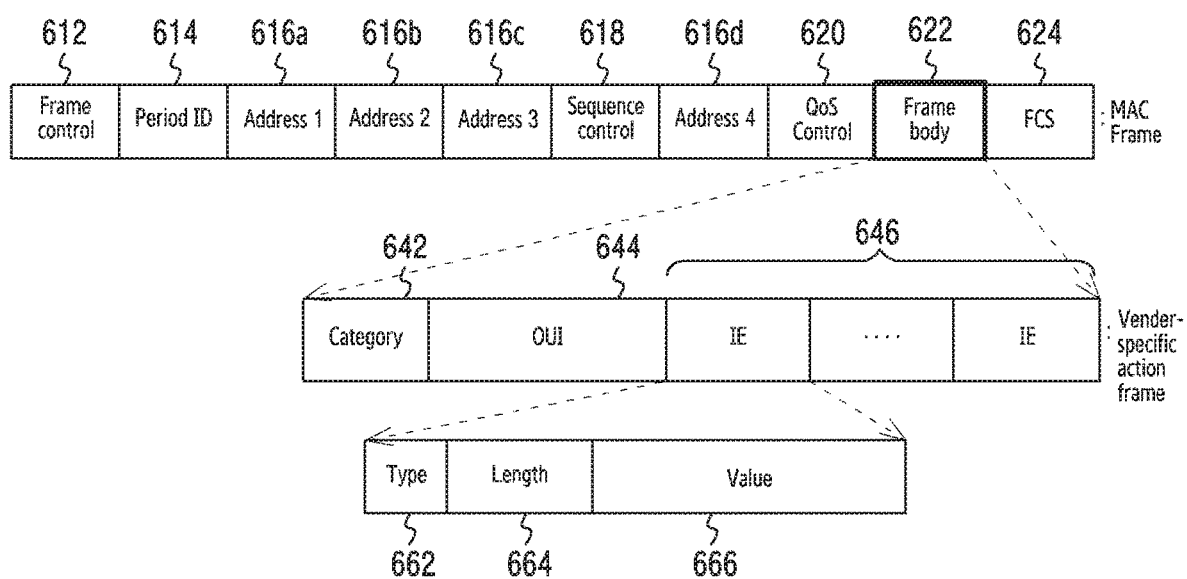
FIG. 6B is a diagram illustrating a message received from a client device in a wireless communication system according to an embodiment of the disclosure.

FIG. 6B is a diagram illustrating a message received from a client device in a wireless communication system according to an embodiment of the disclosure.

Referring to FIG. 6B, according to an embodiment, whether the low-latency service is provided may be indicated by a vender-specific action frame the vender-specific action frame may include "frame control" 612, "period ID" 614, "address 1" 616a, "address 2" 616b, "address 3" 616c, "sequence control" 618, "address 4" 616d, "QoS control" 620, "frame body" 622, and "frame check sequence (FCS)" 624. Here, "frame body" 622 may include a category 642, an organizational unique identifier (OUI) 644, and at least one information element (IE) 646. The at least one IE 646 may include a type 662, a length 664, and a value 666. Here, the OUI in "frame body" may be set to a predetermined value (e.g., "00-00-F0") for indicating that the purpose of the frame is to indicate whether the low-latency service is provided, and the type of IE and the value of an IE may be set to values indicating the low-latency service (e.g., type set to "1", and the value set to "low-latency service" or "identification code corresponding thereto").

According to an embodiment of the disclosure, whether the low-latency service is provided may be indicated by a probe request frame. The probe request frame may include a vender-specific field, and the client device may set the vender-specific field to a value indicating the low-latency service. Accordingly, the service network provision device may identify whether the low-latency service is provided to the client device based on the vender-specific field of the probe request frame.

Figure 7:
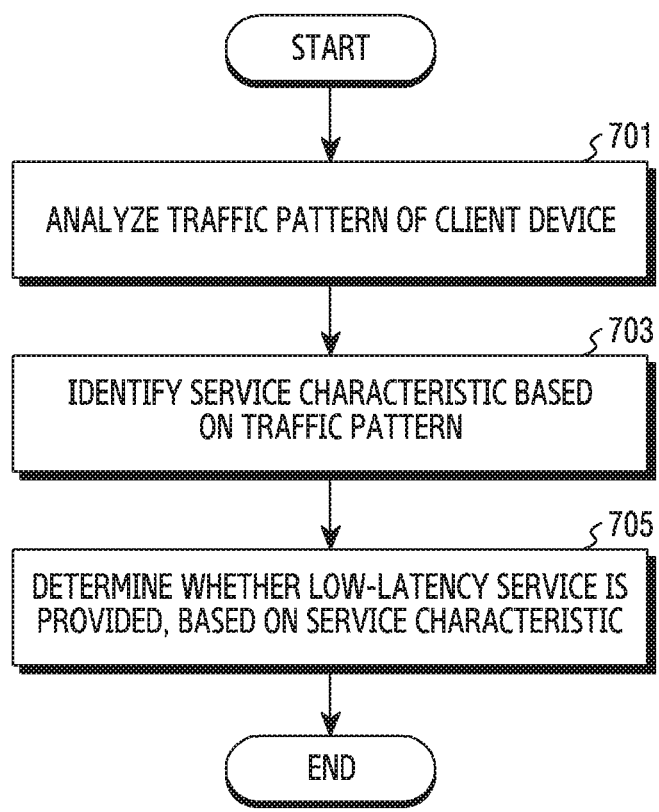
FIG. 7 is a flowchart illustrating an operation procedure of identifying a type of service provided to a client device via traffic analysis in a wireless communication system according to an embodiment of the disclosure.

FIG. 7 is a flowchart illustrating an operation procedure of identifying a type of service provided to a client device via traffic analysis in a wireless communication system according to an embodiment of the disclosure. FIG. 7 illustrates the operation method of the service network provision device 120, which is an example of a procedure of determining the type of service based on the result of an analysis of traffic of a client device.

Referring to FIG. 7, in operation 701, the service network provision device analyzes a traffic pattern of a client device. For example, the service network provision device identifies control information (e.g., a header) included in a packet received from the client device or transmitted to the client device, and classifies the control information. For example, the service network provision device may analyze a user define signature, such as an internet protocol (IP) address, a port number, a network protocol number, a server name indication (SNI), a hypertext transfer protocol (HTTP) header, and the like. To this end, the service network provision device may adopt a deep packet inspection (DPI) engine.

In operation 703, the service network provision device identifies a service characteristic based on the traffic pattern. For example, based on the traffic pattern, the service network provision device may identify at least one of the provider of a corresponding service, the type of service (e.g., real-time streaming, file transmission, web browsing, or the like), QoS requirements, the type of client device (e.g., a mobile device or a desk top), or the type of application. The correlation between the traffic pattern and the service characteristic may be updated via learning.

In operation 705, the service network provision device determines whether the low-latency service is provided or required, using the service characteristic. For example, the service network provision device may determine whether the identified service characteristic needs the low-latency service, based on mapping information between the service characteristic and the low-latency service. For example, the mapping information may be defined in advance, and may be stored in the service network provision device.

As described with reference to FIGS. 6A, 6B, and 7, the client device that receives the low-latency service may be identified by analyzing traffic or a message received from the client device. According to an embodiment of the disclosure, the client device that receives the low-latency service may be identified using a QoS flow identifier (QFI). For example, the service network provision device stores the QFI of downlink traffic, and if uplink traffic corresponding to the traffic is generated, the service network provision device may reflectively map the QFI of the uplink traffic to the same QFI as that of the downlink traffic. For example, if the low-latency service is identified based on the QFI of the downlink traffic, the service network provision device may determine that the downlink traffic is for the low-latency service.

As described above, a transmission delay which may be caused by the power saving mode of a client device may be overcome. A transmission delay may be caused by another factor, in addition to the case in which a client device operates in a state that does not allow communication, such as the power saving mode. For example, a transmission delay may occur due to packet aggregation from among functions provided in a wireless LAN.

Packet aggregation provided in the wireless LAN is a technology for aggregating packets, for example, a plurality of MAC protocol data units (MAC PDUs), and transmitting the same, so as to decrease ACK overhead and increase throughput. An aggregated MAC PDU (hereinafter referred to as an "A-MPDU") includes packets aggregated up to the set maximum length (e.g., 10 ms in the case of 802.11n and 5.484 ms in the case of 802.11ac). An example of downlink communication according to an A-MPDU is illustrated in FIG. 8.

Figure 8:
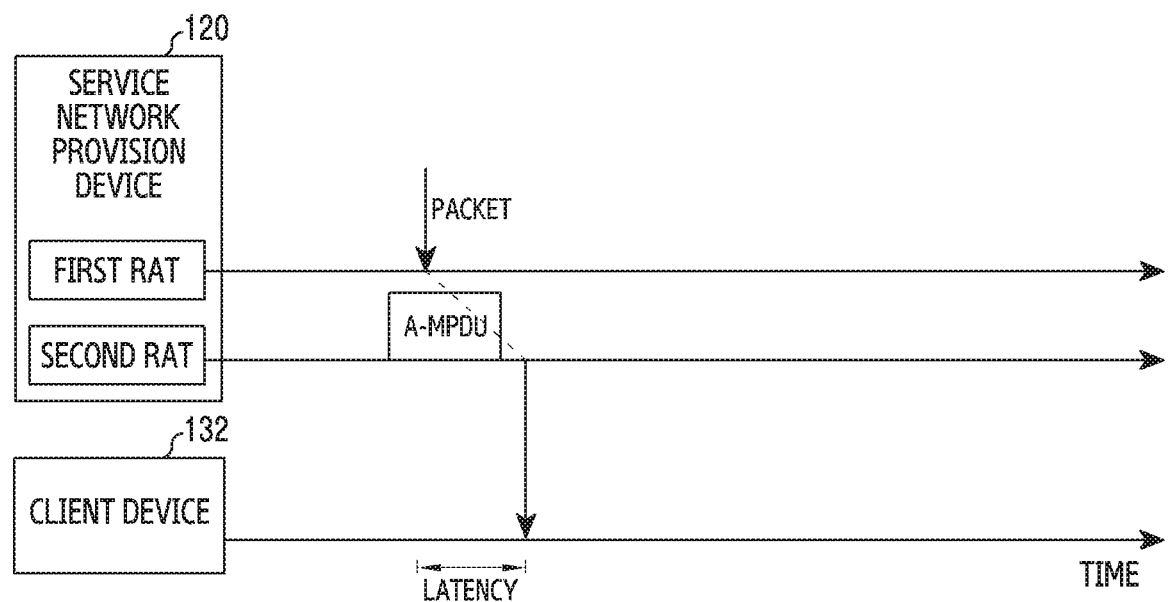
FIG. 8 is a diagram illustrating a packet delay caused by packet aggregation in a wireless communication system according to an embodiment of the disclosure.

FIG. 8 is a diagram illustrating a packet delay caused by packet aggregation in a wireless communication system according to an embodiment of the disclosure.

Referring to FIG. 8, the service network provision device 120 may aggregate and transmit packets transmitted to the client device 132. A wireless channel is continuously occupied during the transmission of an A-MPDU, and thus, a packet received via a first RAT may not be transmitted until the A-MPDU is completely transmitted. Accordingly, a transmission delay may increase. A delay of several milliseconds caused by the A-MPDU may affect the low-latency communication.

Figure 9:
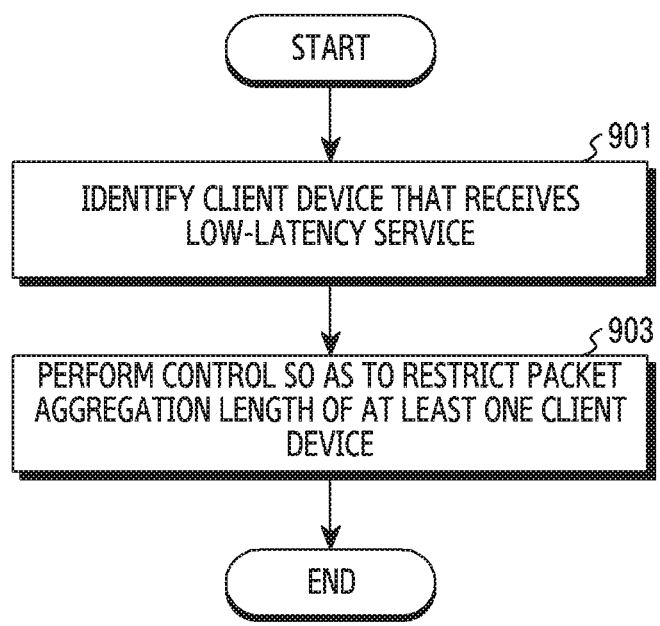
FIG. 9 is a flowchart illustrating an operation procedure of restricting a length of a packet transmitted to a client device in a wireless communication system according to an embodiment of the disclosure.

FIG. 9 is a flowchart illustrating an operation procedure of restricting a length of a packet transmitted to a client device in a wireless communication system according to an embodiment of the disclosure. FIG. 9 illustrates the operation method of the service network provision device 120.

Referring to FIG. 9, in operation 901, the service network provision device identifies a client device that receives a low-latency service. Herein, the client device that receives the low-latency service includes a client device that requires the low-latency service. The client device that receives the low-latency service may be identified based on at least one of information (QoS) associated with a bearer of a first RAT which is mapped to a connection of a second RAT with the client device, a message received from the client device, or an analysis of traffic of the client device. Here, the traffic of the client device includes at least one of traffic transmitted to the client device and traffic received from the client device, and the client device that receives the low-latency service may be specified using identification information (e.g., a MAC address) of a predetermined layer.

In operation 903, the service network provision device performs control so as to restrict a packet aggregation length of at least one client device. In other words, the service network provision device may restrict the maximum length of an A-MPDU generated via packet aggregation by at least one client device. Here, the restriction of the length of the A-MPDU may be applied to a packet transmitted from a client device, or a packet transmitted to a client device. To this end, the service network provision device may reset a variation of the maximum length of the A-MPDU, or may transmit control information to decrease the maximum length of the A-MPDU. For example, the control information may designate the maximum length of the A-MPDU, or may indicate decreasing the maximum length of the A-MPDU.

As described in the embodiment provided with reference to FIG. 9, the service network provision device may restrict the maximum length of the A-MPDU. In this instance, the maximum length of the A-MPDU decreased by restriction may be determined based on the delay requirement of a service. According to an embodiment of the disclosure, the service network provision device may deactivate a packet aggregation function.

According to an embodiment of the disclosure, in association with a downlink packet transmitted to a client device, the service network provision device may restrict the maximum length of an A-MPDU for at least one client device remaining after excluding the client device identified in operation 901 from among client devices that access the service network. In this instance, based on another reason, at least one of the at least one remaining client device may be exempted from the restriction of the maximum length of an A-MPDU. In addition, according to an embodiment of the disclosure, the maximum length of the A-MPDU for the client device that receives the low-latency service may be further restricted. A downlink packet is generated by the service network provision device, and thus, the service network provision device may reset a variable for packet aggregation for each client device, and may control the maximum length of an A-MPDU for each client device.

According to an embodiment of the disclosure, in association with an uplink packet transmitted from a client device, the service network provision device may restrict the maximum length of an A-MPDU for all client devices that access the service network, or for at least one client device remaining after excluding the client device identified in operation 901 from among client devices that access the service network. In this instance, based on another reason, at least one of the at least one remaining client device may be exempted from the restriction of the maximum length of an A-MPDU. An uplink packet is generated by a client device, and the service network provision device transmits control information indicating restriction of the maximum length of an A-MPDU. Here, the control information may be applied in common to the entire service network, or may be applied for each client device. For example, the control information may be transferred via a vender-specific field or a vender-specific action frame in capability information (e.g., a high throughput (HT) capability field and a very HT (VHT) capability field) included in a beacon packet.

The service network provided by the service network provision device may be based on one of the various RATs. For example, according to BLE, communication may be performed at regular connection intervals. The communication based on BLE is illustrated in FIG. 10.

Figure 10:
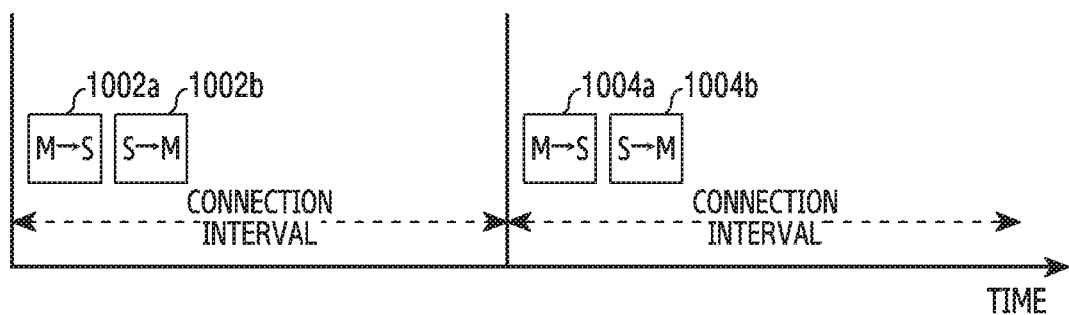
FIG. 10 is a diagram illustrating a packet delay caused by a connection interval of a client device in a wireless communication system according to an embodiment of the disclosure.

FIG. 10 is a diagram illustrating a packet delay caused by a connection interval of a client device in a wireless communication system according to an embodiment of the disclosure.

Referring to FIG. 10, a packet 1002a from a master (e.g., the service network provision device 120) to a slave (e.g., the client device 132) and a packet 1002b from the slave to the master are transmitted at a first connection. Subsequently, after a connection interval elapses, a second connection is established, and a packet 1004a from the master to the slave and a packet 1004b from the slave to the master are transmitted. In this instance, if the connection interval is long, a transmission delay may occur. The initial value (default) of the connection interval of BLE devices may be set variously depending on a manufacturer or the like, and thus, a connection interval needs to be appropriately controlled for a low-latency service. Embodiments associated with controlling a connection interval, which are described below, may be applicable to the case based on a RAT that periodically performs communication, in addition to BLE.

Figure 11:
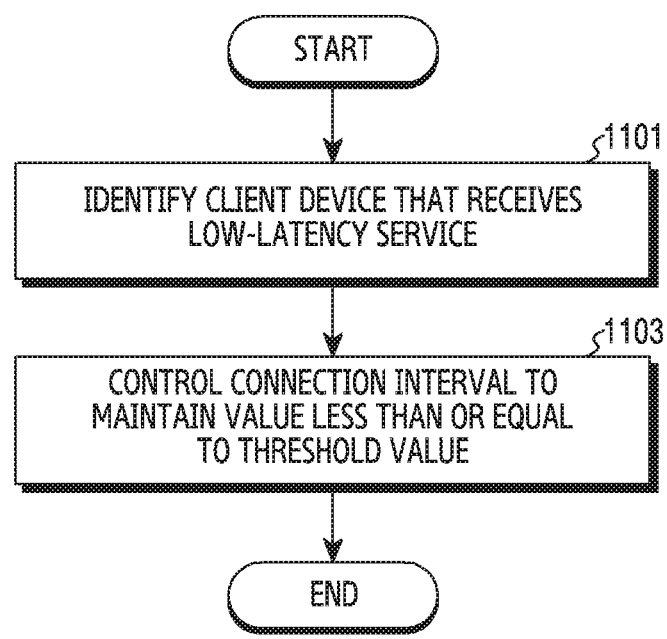
FIG. 11 is a flowchart illustrating an operation procedure of controlling a connection interval of a client device in a wireless communication system according to an embodiment of the disclosure.

FIG. 11 is a flowchart illustrating an operation procedure of controlling a connection interval of a client device in a wireless communication system according to an embodiment of the disclosure. FIG. 11 illustrates the operation method of the service network provision device 120.

Referring to FIG. 11, in operation 1101, the service network provision device identifies a client device that receives a low-latency service. Herein, the client device that receives the low-latency service includes a client device that requires the low-latency service. The client device that receives the low-latency service may be identified based on at least one of information (QoS) associated with a bearer of a first RAT which is mapped to a connection of a second RAT with the client device, a message received from the client device, or an analysis of traffic of the client device.

In operation 1103, the service network provision device controls a connection interval to maintain a value less than or equal to a threshold value. In other words, the service network provision device may decrease the connection interval between the identified client device and the service network provision device to be less than or equal to the threshold value. For example, the service network provision device may transmit the value of a controlled connection interval using a control message (e.g., a minimum connection interval and maximum connection interval field included in a connection parameter update request). Alternatively, the service network provision device may transmit an indicator that requests a change of the value of the connection interval to a predetermined value (e.g., the minimum value). According to various embodiments of the disclosure, the value of the connection interval may be controlled to be a value smaller than a delay requirement or to be a predetermined value (e.g., the minimum value). In addition, the value of the connection interval may be decreased based on a history associated with decreasing a connection interval, and a history associated with provision of a low-latency service.

As described above, in the case of BLE, communication is performed at regular connection intervals. In this instance, the operation of a slave device may be different according to a setting.

Figure 12:
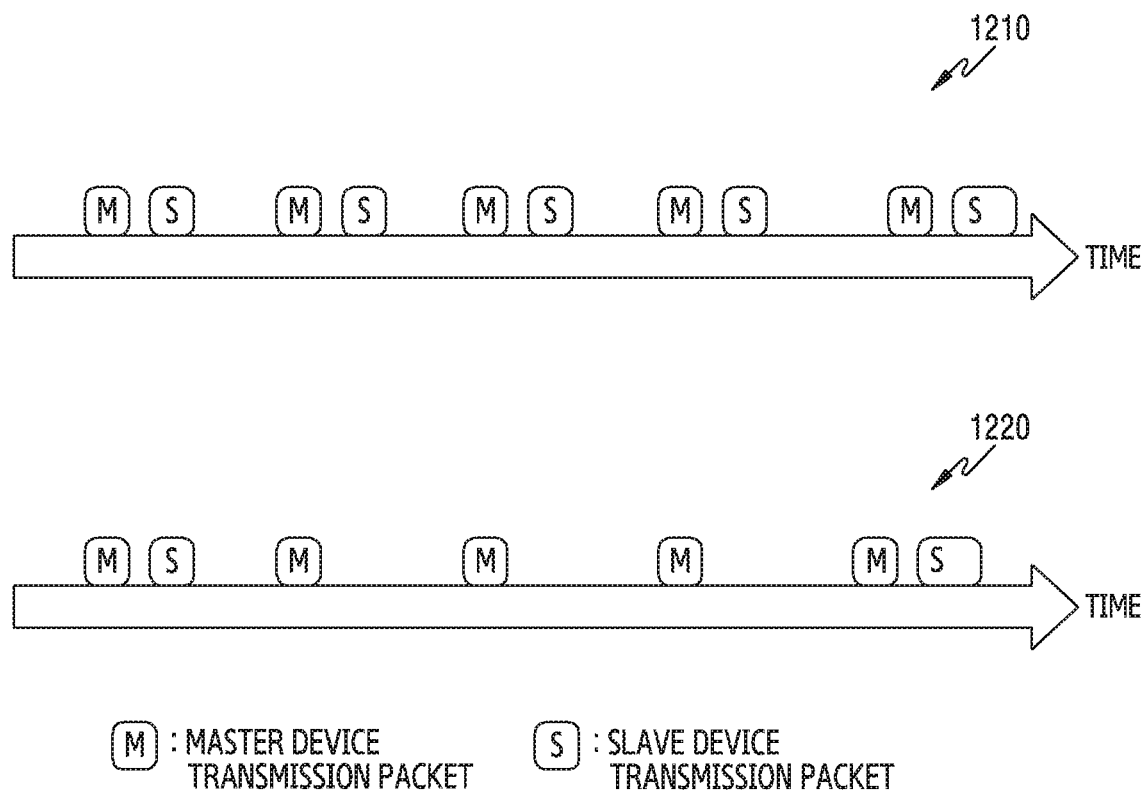
FIG. 12 is a diagram illustrating a packet delay caused by a connection-related setting of a client device in a wireless communication system according to an embodiment of the disclosure.

FIG. 12 is a diagram illustrating a packet delay caused by a connection-related setting of a client device in a wireless communication system according to an embodiment of the disclosure.

Referring to FIG. 12, diagram 1210 is the case in which a slave latency is set to "OFF", and diagram 1220 is the case in which a slave latency is set to "ON". If the slave latency is set to "ON", a slave device may perform wake-up at some of the connection points, and may not transmit data at the other remaining connection points, as illustrated in diagram 1220. Due to the operation of the slave device, a transmission delay may occur.

Figure 13:
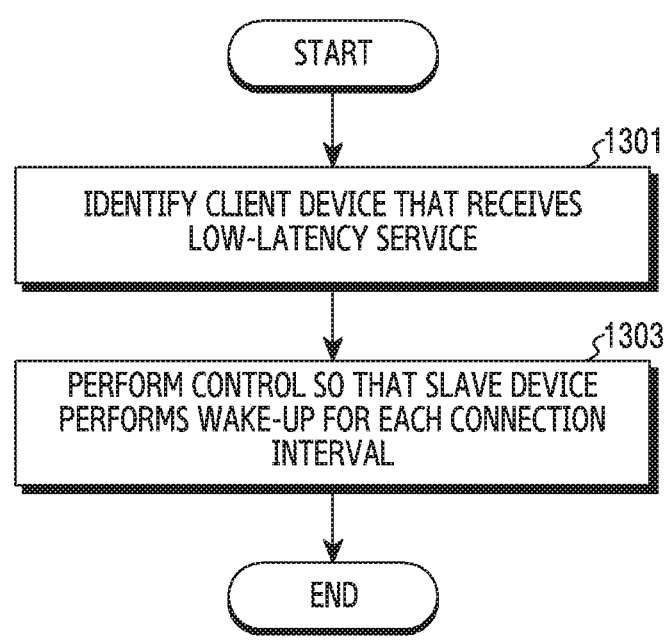
FIG. 13 is a flowchart illustrating an operation procedure of controlling a connection-related setting of a client device in a wireless communication system according to an embodiment of the disclosure.

FIG. 13 is a flowchart illustrating an operation procedure of controlling a connection-related setting of a client device in a wireless communication system according to an embodiment of the disclosure. FIG. 13 illustrates the operation method of the service network provision device 120.

Referring to FIG. 13, in operation 1301, the service network provision device identifies a client device that receives a low-latency service. Herein, the client device that receives the low-latency service includes a client device that requires the low-latency service. The client device that receives the low-latency service may be identified based on at least one of information (QoS) associated with a bearer of a first RAT which is mapped to a connection of a second RAT with the client device, a message received from the client device, or an analysis of traffic of the client device.

In operation 1303, the service network provision device performs control so that a slave device performs wake-up for each connection interval. For example, the service network provision device may release a slave latency setting of the corresponding client device. For example, the service network provision device may request change of the setting using a control message (e.g., a slave latency field included in a connection parameter update request). For example, the service network provision device sets a slave latency set value to a negative value (e.g., "0"), so as to enable the corresponding client device to perform wake-up for each connection event.

In addition to the embodiments associated with changing settings related to a client device, such as restriction of a power saving mode, restriction of a packet aggregation length, control of a connection interval, and the like, by controlling the priority of traffic of a client device that receives a low-latency service, a packet delay may be decreased. Generally, downlink traffic is input into one of a plurality of queues having different priorities depending on the type of service or the like, and may be transmitted according to a scheduling result. Therefore, the service network provision device may control the priority of traffic for the low-latency service by defining and selecting a queue, and may decrease a transmission delay.

Figure 14:
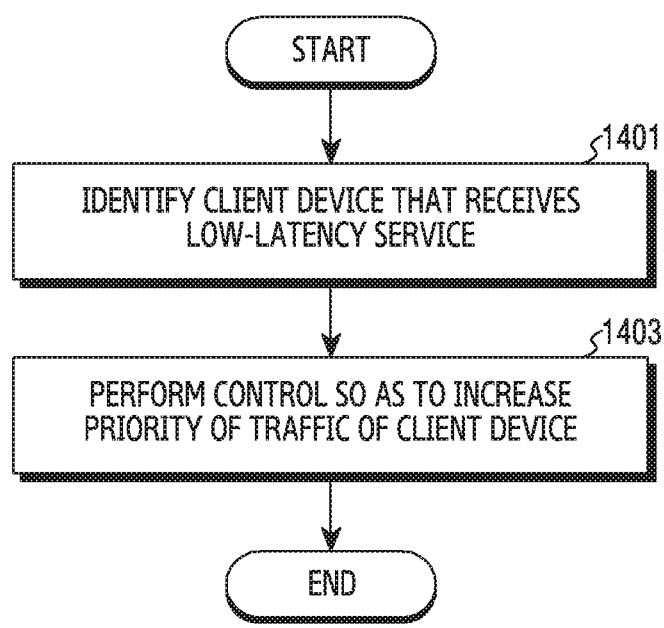
FIG. 14 is a flowchart illustrating an operation procedure of controlling a priority of traffic of a client device in a wireless communication system according to an embodiment of the disclosure.

FIG. 14 is a flowchart illustrating an operation procedure of controlling a priority of traffic of a client device in a wireless communication system according to an embodiment of the disclosure. FIG. 14 illustrates the operation method of the service network provision device 120.

Referring to FIG. 14, in operation 1401, the service network provision device identifies a client device that receives a low-latency service. Herein, the client device that receives the low-latency service includes a client device that requires the low-latency service. The client device that receives the low-latency service may be identified based on at least one of information (QoS) associated with a bearer of a first RAT which is mapped to a connection of a second RAT with the client device, a message received from the client device, or an analysis of traffic of the client device.

In operation 1403, the service network provision device performs control so as to increase the priority of traffic of the client device. For example, the service network provision device may input traffic of the client device that receives the low-latency service into a queue having a high priority. Here, the queue having a high priority may be one of the queues generally used or a queue designed for the low-latency service.

According to the embodiments described with reference to FIG. 14, the service network provision device increases the priority of traffic for the low-latency service. The priority of the traffic may be controlled by selecting a queue to which the traffic is to be input.

According to an embodiment of the disclosure, the service network provision device may input the traffic for the low-latency service into a queue having the highest priority from among a plurality of queues. Accordingly, there is a high possibility that the traffic for the low-latency service is transmitted earlier than traffic stored in other queues. For example, the service network provision device may control the priority of traffic for the low-latency service in contention by selecting a queue.

According to an embodiment of the disclosure, the service network provision device defines a separate queue (hereinafter, referred to as a "low-latency queue") for the low-latency service, and inputs traffic for the low-latency service into a low-latency queue. The contention parameter of the low-latency queue may be controlled to have a high priority. For example, the low-latency queue may be defined to have a smaller arbitration interframe space number (AIFSN) than other queues, or to have a smaller contention window than other queues. Through the above, the service network provision device may transmit the traffic for the low-latency service by having a shorter delay than the transmission of traffic input into other queues.

In addition, an absolute priority may be assigned to the low-latency queue. For example, the service network provision device may allow transmission of packets stored in other queues only when the low-latency queue is empty. For example, the service network provision device may prevent transmission of packets stored in other queues while a packet remains in the low-latency queue. Accordingly, the service network provision device may perform control so that packets stored in the low-latency queue are transmitted strictly earlier than other packets.

The various embodiments described above are to provide the low-latency communication service defined in a first network to a client device. The first network may further provide a broadband communication service in addition to the low-latency communication service. Here, the broadband communication service may be referred to as an enhanced mobile broadband (eMBB) service. The broadband service is to secure high average spectrum efficiency, and is a service designed to secure at least a predetermined data transmission speed. However, the client device is not directly under the control of the first network, and thus, according to the protocol of a RAT of a service network, that is, a second network, the broadband service of the first network may be difficult to apply. Therefore, the disclosure describes embodiments for providing a broadband service to a client device that accesses the second network.

Figure 15:
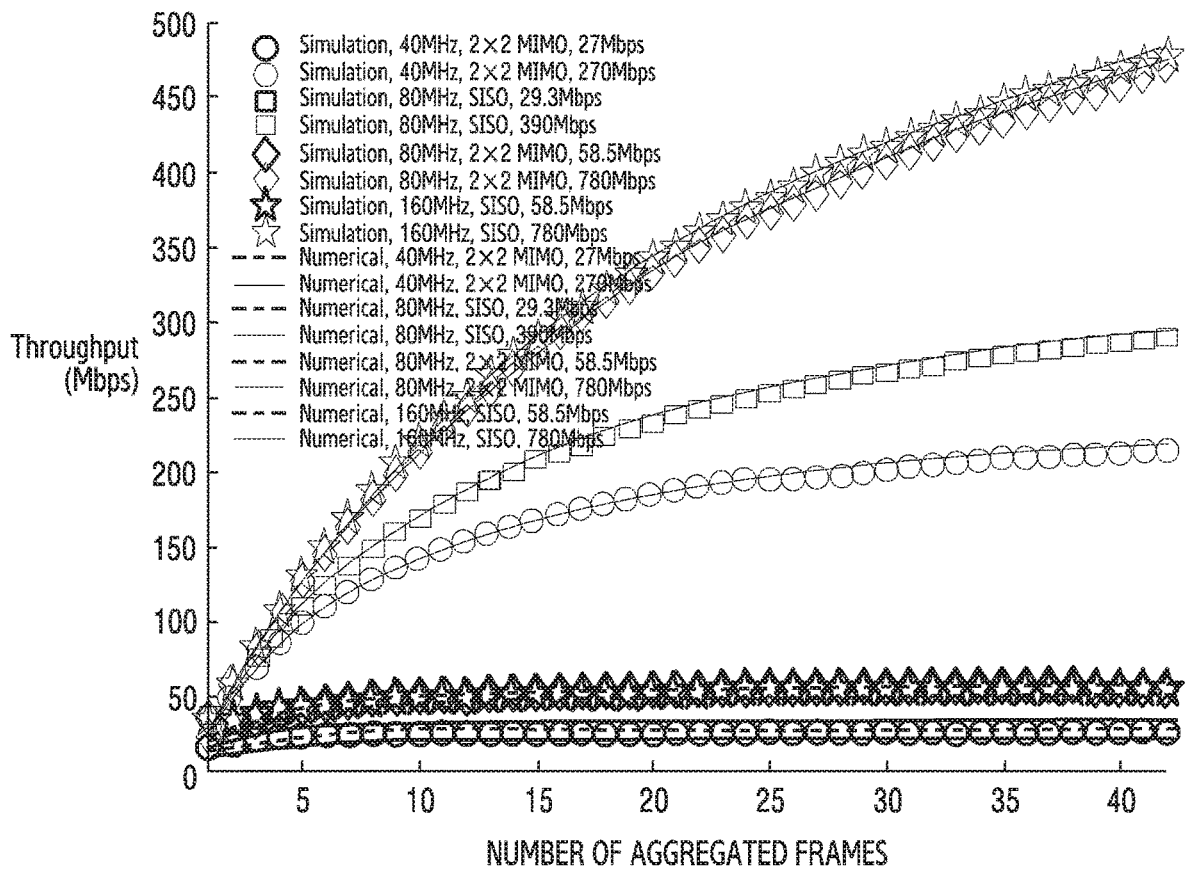
FIG. 15 is a diagram illustrating throughput providable in a service network in a wireless communication system according to an embodiment of the disclosure.

FIG. 15 is a block diagram illustrating throughput providable in a service network in a wireless communication system according to an embodiment of the disclosure. In the case of a broadband service of a first network, a peak data rate may be supported up to 20 Gb/s.

Referring to FIG. 15, in the case of a wireless LAN, if 160 MHz and 8 spatial streams are used, a peak data transmission rate up to 6.7 Gbps may be supported according to 802.11ac. When the wireless LAN is operated, only a 20 MHz or 40 MHz band is often used based on interference. A data transmission rate decreases in proportion to a bandwidth. Accordingly, when 20 MHz is used, the peak data transmission rate is 693 Mb/s, which is a data transmission rate lower than 1 Gb/s. In addition, as a data transmission rate increases, the throughput is changed more dramatically according to the number of packets included in a single A-MPDU. Therefore, if the maximum A-MPDU length is set to a small value, it is difficult to obtain a high throughput.

Figure 16:
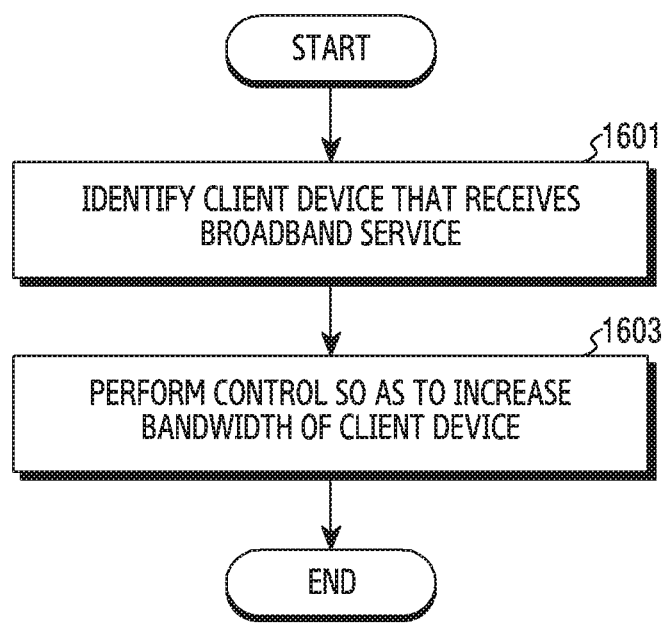
FIG. 16 is a flowchart illustrating an operation procedure of increasing a transmission bandwidth of a client device in a wireless communication system according to an embodiment of the disclosure.

FIG. 16 is a flowchart illustrating an operation procedure of increasing a transmission bandwidth of a client device in a wireless communication system according to an embodiment of the disclosure. FIG. 16 illustrates an operation method of the service network provision device 120 as a procedure for improving throughput by increasing a bandwidth.

Referring to FIG. 16, in operation 1601, the service network provision device identifies a client device that receives a broadband service. The client device that receives the broadband service may be identified based on at least one of information (QoS) associated with a bearer of a first RAT which is mapped to a connection of a second RAT with the client device, a message received from the client device, or an analysis of traffic of the client device.

In operation 1603, the service network provision device performs control so as to increase the bandwidth of the client device. For example, the service network provision device may use a plurality of channels, which are adjacent to each other on the frequency axis, together using channel bonding, and may increase the channel bandwidth of the client device. In this instance, the number of channels which are to bond together may be determined depending on a required bandwidth. For example, the service network provision device may determine a required bandwidth to enable a providable data transmission rate to be higher than a required peak data transmission rate, or may determine a required bandwidth based on a predetermined value (e.g., the maximum value or the maximum value within an available range).

According to the embodiment provided with reference to FIG. 16, the service network provision device may increase the bandwidth of the client device. In this instance, additionally, the service network provision device may measure interference of an adjacent channel before determining a bandwidth. If it is difficult to increase a bandwidth at the current primary channel due to interference, the service network provision device may change the primary channel. To this end, the service network provision device may transmit a control message (e.g., a channel switch announcement frame) that indicates changing of a channel. The control message may further include a bandwidth value.

Figure 17:
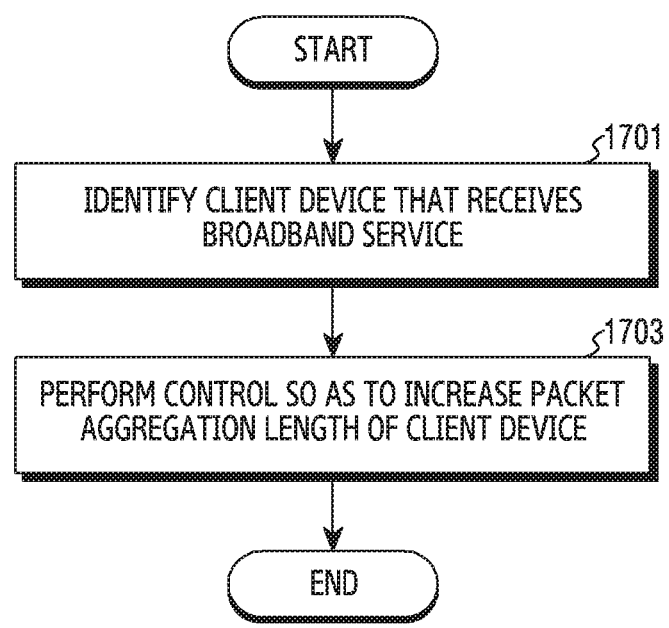
FIG. 17 is a flowchart illustrating an operation procedure of increasing a size of a packet transmitted to a client device in a wireless communication system according to an embodiment of the disclosure.

FIG. 17 is a flowchart illustrating an operation procedure of increasing a size of a packet transmitted to a client device in a wireless communication system according to an embodiment of the disclosure. FIG. 17 illustrates an operation method of the service network provision device 120 as a procedure of improving throughput by increasing a packet size.

Referring to FIG. 17, in operation 1701, the service network provision device identifies a client device that receives a broadband service. Herein, the client device that receives the broadband service includes a client device that requires the broadband service. The client device that receives the broadband service may be identified based on at least one of information (QoS) associated with a bearer of a first RAT which is mapped to a connection of a second RAT with the client device, a message received from the client device, or an analysis of traffic of the client device.

In operation 1703, the service network provision device performs control so as to increase a packet aggregation length of the client device. For example, the service network provision device may increase the maximum length of an A-MPDU for the client device that receives the broadband service. For example, the maximum length of the A-MPDU may be set to the maximum value allowed by the client device, or may be set according to a data transmission rate requirement. To this end, the service network provision device may reset a variation of the maximum length of the A-MPDU, or may transmit control information to increase the maximum length of the A-MPDU. Additionally, the service network provision device may decrease a packet aggregation length of at least one client device remaining after excluding the identified client device.

As described above, a large capacity broadband service may be supported by the above described methods, such as channel bonding, packet aggregation length control, or the like. According to an embodiment of the disclosure, similar to the embodiment that controls an order of priority using a queue in order to overcome a transmission delay, the service network provision device may input traffic for the broadband service to a queue having a high priority and may improve throughput.

According to various embodiments which have been described above, a low-latency service or a broadband service is provided via a service network by controlling the configuration or the state of the service network. In this instance, if the client device supports a plurality of protocols which are usable as service networks, one of the protocols may be preferred depending on a service. Hereinafter, an embodiment for selecting one of a plurality of protocols that a client device supports, is described.

Figure 18:
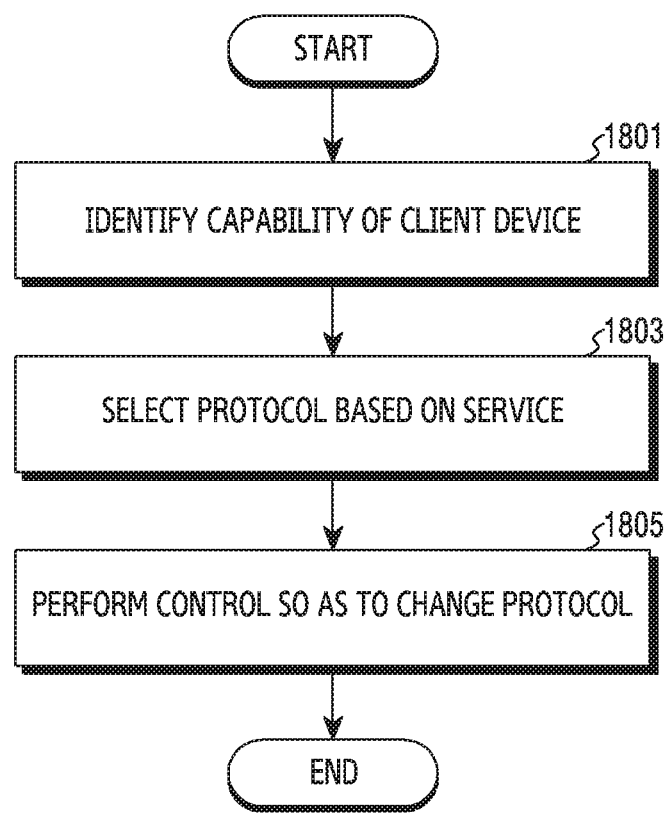
FIG. 18 is a flowchart illustrating an operation procedure of controlling a communication protocol of a client device in a wireless communication system according to an embodiment of the disclosure.

FIG. 18 is a flowchart illustrating an operation procedure of controlling a communication protocol of a client device in a wireless communication system according to an embodiment of the disclosure. FIG. 18 illustrates an operation method of the service network provision device 120 as an example of a procedure of selecting a communication protocol appropriate for a service.

Referring to FIG. 18, in operation 1801, the service network provision device identifies the capability of a client device. For example, the capability may include the type of protocol supported by the client device, the state of a power (e.g., a battery, an external power source, or the like), and the like. According to an embodiment of the disclosure, the service network provision device may receive information indicating a protocol supportable to the client device. According to an embodiment of the disclosure, the service network provision device may identify a supportable protocol based on a communication history of the past.

In operation 1803, the service network provision device selects a protocol based on a service. According to an embodiment of the disclosure, the protocol corresponding to the service may be defined in advance. According to an embodiment of the disclosure, the protocol corresponding to the service may be different depending on the state of a service network. The service network provision device may identify the characteristic of the service based on at least one of traffic analysis and QoS information, and may select a protocol corresponding to the identified characteristic of the service.

In operation 1805, the service network provision device may change the protocol. The service network provision device may terminate a connection based on a first protocol which is currently used, and may newly establish a connection based on a new second protocol. To this end, the service network provision device may transmit or receive at least one message for releasing or establishing a connection with the client device. According to an embodiment of the disclosure, the protocol may be changed by performing two separate procedures, that is, a procedure of releasing the connection based on the first protocol and a procedure of establishing the connection based on the second protocol. In this instance, the service network provision device may indicate the second protocol in advance via the first protocol. According to an embodiment of the disclosure, the protocol may be changed by handover between heterogeneous protocols, that is, handover from the first protocol to the second protocol.

In the embodiment which has been described with reference to FIG. 18, the service network provision device may select a protocol based on a service. In this instance, the protocol corresponding to the service may be defined in advance, or may be different depending on the state of the service network.

According to an embodiment of the disclosure, the protocol corresponding to the service may be defined according to the QoS of the service. For example, a service based on a low bandwidth (e.g., music streaming) may correspond to BLE, and a large capacity service (e.g., video streaming, game, VR, and the like) may correspond to wireless LAN. In this instance, the service network provision device may store predetermined mapping information (e.g., a mapping table), and may search the mapping information, so as to identify a protocol corresponding to an identified service.

According to an embodiment of the disclosure, the protocol corresponding to the service may be selected based on the state of the service network. For example, if the client device uses a large capacity service, a protocol in which competition for resources among devices is low may be selected. More particularly, in the case in which a client device that supports the first protocol and the second protocol uses a large capacity service, if other devices that perform communication based on the first protocol exist and a device that performs communication based on the second protocol does not exist, the service network provision device may select the second protocol.

According to an embodiment of the disclosure, the protocol corresponding to the service may be selected based on the state of the client device. For example, the protocol may be selected according to the amount of charge remaining in the battery of the client device. More particularly, if the amount of charge remaining in the battery is less than or equal to a threshold value, a protocol (e.g., BLE) that enables communication with low-power may be selected.

Figure 19A:
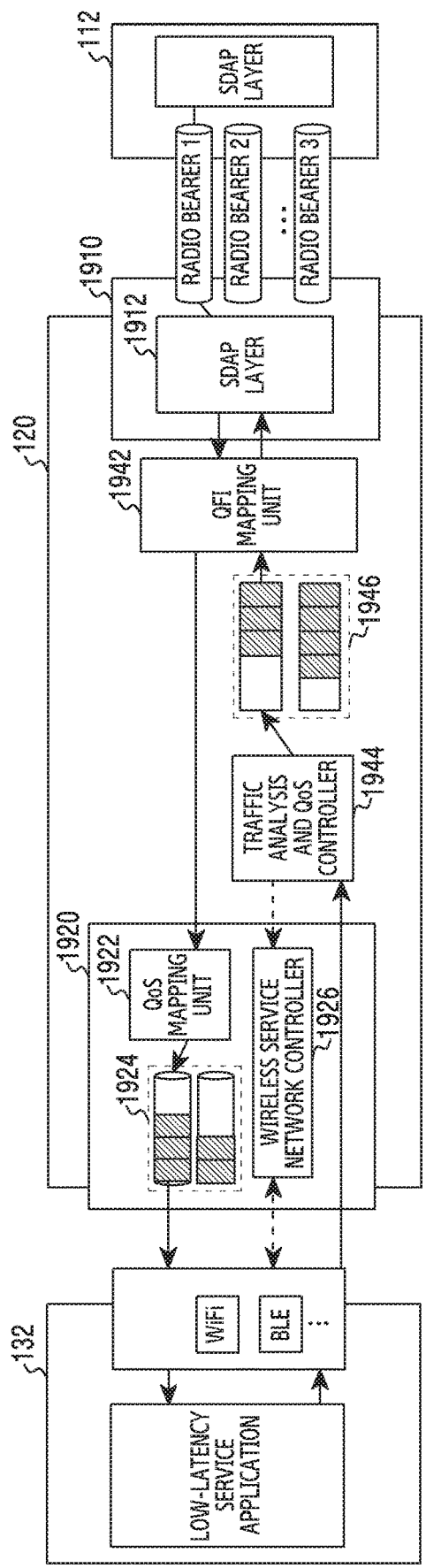
FIG. 19A is a diagram illustrating a functional structure of a service network provision device for providing a service network in a wireless communication system according to an embodiment of the disclosure.

FIG. 19A is a diagram illustrating a functional configuration of a service network provision device in a wireless communication system according to an embodiment of the disclosure.

Figure 19B:
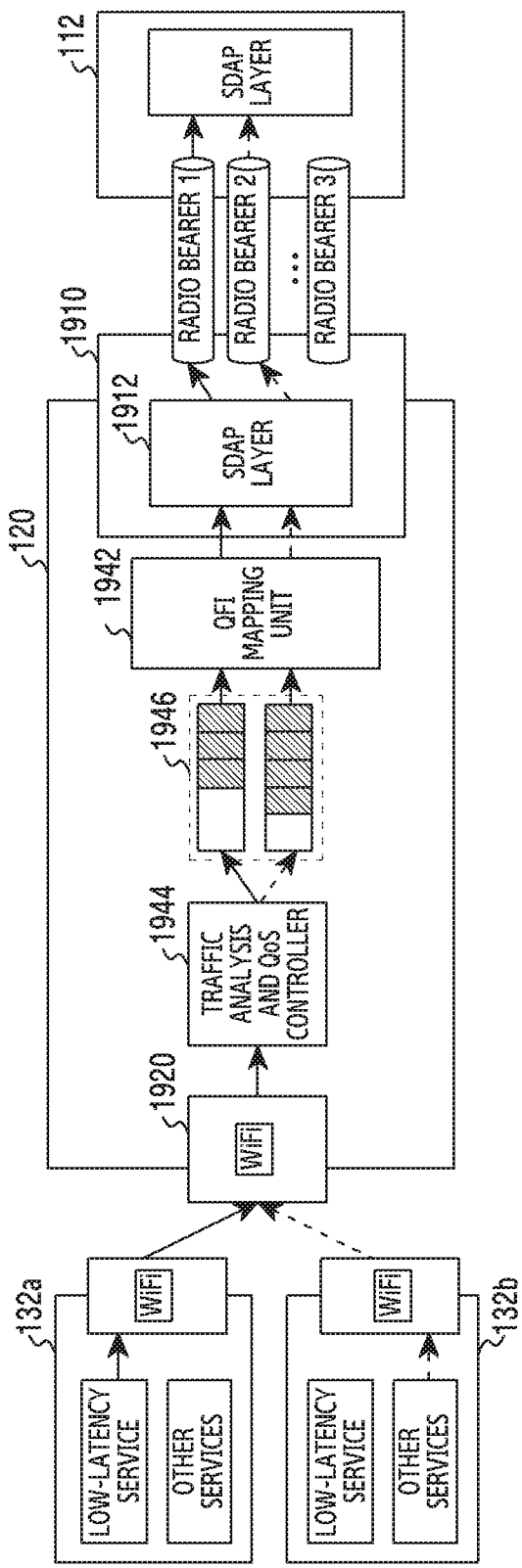
FIG. 19B is a diagram illustrating a functional structure of a service network provision device for providing a service network in a wireless communication system according to an embodiment of the disclosure.

FIG. 19B is a diagram illustrating a functional configuration of a service network provision device in a wireless communication system according to an embodiment of the disclosure.

Figure 19C:
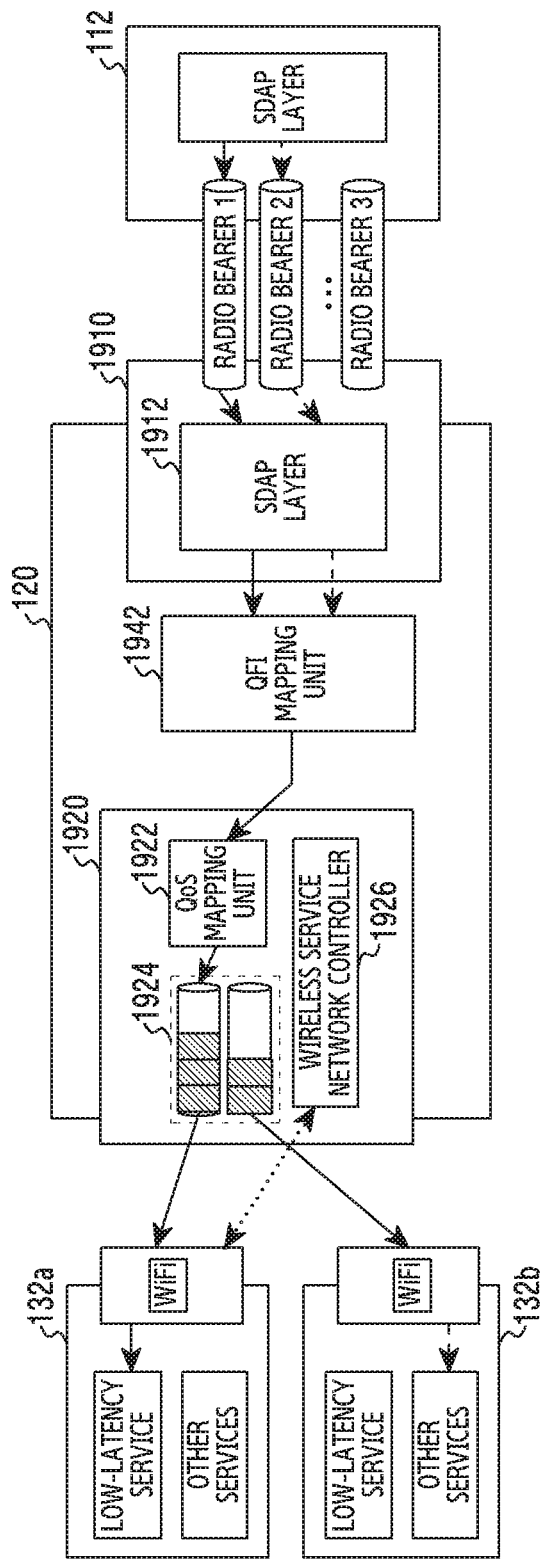
FIG. 19C is a diagram illustrating a functional structure of a service network provision device for providing a service network in a wireless communication system according to an embodiment of the disclosure.

FIG. 19C is a diagram illustrating a functional configuration of a service network provision device in a wireless communication system according to an embodiment of the disclosure. FIG. 19A is a function structure of the service network provision device 120 that operates according to the above-described various embodiments of the disclosure, FIG. 19B is a function structure of the service network provision device 120 that operates according to the above-described various embodiments of the disclosure, and FIG. 19C is a function structure of the service network provision device 120 that operates according to the above-described various embodiments. FIG. 19A illustrates the case in which the RAT of a second network is a wireless LAN (e.g., wireless fidelity (WiFi)) or BLE, FIG. 19B illustrates the case in which the RAT of a second network is a wireless LAN (e.g., wireless fidelity (WiFi)) or BLE, and FIG. 19C illustrates the case in which the RAT of a second network is a wireless LAN (e.g., wireless fidelity (WiFi)) or BLE.

Referring to FIG. 19A, the service network provision device 120 may include a first communication unit 1910, a second communication unit 1920, a QFI mapping unit 1942, a traffic analysis and QoS controller 1944, and a buffer 1946.

The first communication unit 1910 may perform a function of communicating with the base station 112, and may include the first communication unit 210 of FIG. 2. The first communication unit 1910 may perform a function of an SDAP layer 1912, and may perform transmission and reception of traffic with the SDAP layer of the base station 112 via at least one radio bearer. The first communication unit 1910 may add QFI information for each piece of traffic to a packet header of the SDAP layer.

The second communication unit 1920 may perform a function of communicating with the client device 132, and may include the second communication unit 220 of FIG. 2. The second communication unit 1920 may include a buffer 1924 that includes queues for storing downlink traffic, a QoS mapping unit 1922 that provides QoS scheduling in a manner complying with the second RAT according to the QFI of the downlink traffic in a wireless interface of the service network, and a wireless service network controller 1926 that controls settings related to the second RAT.

The QFI mapping unit 1942 extracts and transfers QFI information required by a buffer for each service provided by a first network. The traffic analysis and QoS controller 1944 may detect or analyze an application of the client device, and may determine the type of service (e.g., a low-latency service and a broadband service). The traffic analysis and QoS controller 1944 may perform scheduling using a buffer with priority according to the type of service of the first network, and may transfer traffic to the first communication unit 1910.

Referring to FIG. 19B, the flow of uplink traffic is described. The service network provision device 120 may provide a second network to the client devices 132a and 132b via the second communication unit 1920 that provides a WiFi interface. In order to identify the type of service of a first network, the traffic analysis and QoS controller 1944 of the service network provision device may analyze uplink traffic using a DPI engine and the like, may classify the type of application, the type of service, and the like, and may transfer traffic to the buffer 1946 that has a corresponding priority according to the classified type of service. In order to secure end-to-end QoS, the QFI mapping unit 1942 of the service network provision device 120 may add/update a QFI value according to a buffer based on the type of service, and may provide a packet including the QFI value to the first communication unit 1910. As described above, the service network provision device 120 may classify received traffic based on the type of service, and may input the classified traffic to the buffer 1946 which is distinct for each type of service. The QFI mapping unit 1942 may transfer corresponding QFI information according to the priority of a buffer/type of service of a packet received for each buffer. The SDAP layer 1912 of the first communication unit 1910 may update a QFI field in an SDAP header of a provided packet based on a received QFI value, and may transmit the same. To this end, the end-to-end QoS may be secured.

Referring to FIG. 19C, the flow of downlink traffic is described. A QoS mapping unit 1922 included in the second communication unit 1920 of the service network provision device 120 may input a packet to the buffer 1924 based on the QFI of downlink traffic detected by the QFI mapping unit 1942, and may transmit data according to the priority of a queue. In this instance, the wireless service network controller 1926 of the service network provision device 120 may perform control, so as to decrease the transmission period of a beacon signal so that data is quickly transmitted to the client devices 132a and 132b currently accessing the service network, or to transmit a null packet so as to prevent entering a sleep mode. Through the above, an optimal communication service, such as a low-latency service or a broadband service, between the service network provision device 120 and the client devices 132a and 132b may be provided according to the type of service.

In the above-described embodiments of the disclosure, the QoS identifier (QI) and QFI of the first network may be defined as shown in Table 1.

TABLE 1

| QI value & QFI | Example Service |
| --- | --- |
| 1 | conversational voice |
| 2 | conversational voice (live streaming) |
| 3 | real time gaming, V2X message |
| 4 | non-conversational voice (buffered streaming) |
| 65 | mission critical user plane push to talk voice (e.g., MCPTT) |
| 66 | non-mission critical user plane push to talk voice |
| 75 | V2X message |
| 5 | IMS signaling |
| 6 | video (buffered streaming) TCP-based (e.g., www, e-mail, chat, ftp, p2p file sharing, progressive video, etc) |
| 7 | voice, video (live streaming), interactive gaming |
| 8 | video (buffered streaming) TCP-based (e.g., www, e-mail, chat, ftp, p2p file sharing, progressive video, etc) |
| 9 | video (buffered streaming) TCP-based (e.g., www, e-mail, chat, ftp, p2p file sharing, progressive video, etc) |
| 69 | mission critical user plane push to talk voice (e.g., MCPTT signaling) mission critical data (e.g., example services are the same as QCI 6/8/9) |
| 70 | mission critical user plane push to talk voice (e.g., MCPTT signaling) mission critical data (e.g., example services are the same as QCI 6/8/9) |
| 79 | V2X message |

A bearer may be defined in advance, which secures the quality of a corresponding service, such as a type of resource required for each service, such as an example service or the like (e.g., guaranteed bit rate (GBR) or non-GBR (NGBR)), a scheduling priority, a packet delay, a target packet error rate, a bandwidth, QoS, and the like. For example, if it is determined that a VR game service belongs to real time gaming, the QFI of the corresponding traffic may be set or updated to "3", and the corresponding traffic may be transferred to a bearer corresponding thereto.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the non-volatile memories may form a memory in which the program is stored. Further, a plurality of such memories may be included in the electronic device.

In addition, the programs may be stored in an attachable storage device which is accessible through communication networks, such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus in a wireless communication system, the apparatus comprising:
a first transceiver configured to support a first radio access technology (RAT);
a second transceiver configured to support a second RAT;
at least one processor configured to:
access a base station using the first RAT,
provide a service network to at least one client device using the second RAT,
identify a request for a low-latency service based on at least one of:
information included in a message received from the at least one client device,
a quality of service (QoS) flow identity (QFI) of a traffic for the at least one client device, or
a result of analysis of the traffic for the at least one client device, and
transmit, to the at least one client device, at least one signal to restrict the at least one client device from entering a power saving mode.

2. The apparatus of claim 1, wherein the at least one processor is further configured to transmit a beacon signal at intervals of time shorter than a waiting time of the at least one client device for entering the power saving mode.

3. The apparatus of claim 1,
wherein the at least one processor is further configured to transmit a data packet periodically to the at least one client device, and
wherein the data packet comprises null data, dummy data, or data of a predetermined value.

4. The apparatus of claim 1, wherein the at least one processor is further configured to transmit a message that indicates maintaining an active mode to the at least one client device.

5. The apparatus of claim 1, wherein the at least one processor is further configured to decrease a maximum length of an aggregated packet in association with a packet aggregation function set for the at least one client device remaining after excluding the at least one client device from among client devices accessing the service network.

6. The apparatus of claim 5, wherein the at least one processor is further configured to transmit a control message including an indication associated with decreasing the maximum length of the aggregated packet or a decreased maximum length value.

7. The apparatus of claim 1, wherein the at least one processor is further configured to transmit a control message for decreasing a connection interval of periodic connection events of the at least one client device in the service network.

8. The apparatus of claim 1, wherein the at least one processor is further configured to transmit a control message for controlling the at least one client device to perform wake-up in all periodic connection events of the at least one client device in the service network.

9. The apparatus of claim 1, wherein the at least one processor is further configured input the traffic of the at least one client device into a queue having a highest priority among a plurality of queues.

10. The apparatus of claim 1, wherein, if the traffic of the at least one client device is transferred via a broadband service provided in the first RAT, the at least one processor is further configured to increase a bandwidth of the client device using channel bonding.

11. The apparatus of claim 1, wherein, if the traffic of the at least one client device is transferred via a broadband service provided in the first RAT, the at least one processor is further configured to increase a maximum length of an aggregated packet associated with a packet aggregation function set for the at least one client device.

12. A method performed by an apparatus in a wireless communication system, the method comprising:
    accessing a base station using a first radio access technology (RAT);
    providing a service network to at least one client device using a second RAT;
    identifying a request for a low-latency service based on at least one of:
        information included in a message received from the at least one client device,
        a quality of service (QoS) flow identity (QFI) of a traffic for the at least one client device, or
        a result of analysis of the traffic for the at least one client device; and
    transmitting, to the at least one client device, at least one signal to restrict the at least one client device from entering a power saving mode.

13. The method of claim 12, wherein the transmitting of the at least one signal comprises:
    transmitting a beacon signal at intervals of time shorter than a waiting time of the at least one client device for entering the power saving mode.

14. The method of claim 12,
    wherein the transmitting the at least one signal comprises periodically transmitting a data packet to the at least one client device, and
    wherein the data packet comprises null data, dummy data, or data of a predetermined value.

15. The method of claim 12, wherein the transmitting of the at least one signal comprises:
    transmitting a message indicating maintaining of an active mode to the at least one client device.

* * * * *